(12) United States Patent
Boivin et al.

(10) Patent No.: US 6,505,896 B1
(45) Date of Patent: Jan. 14, 2003

(54) TRACK FOR SNOW VEHICLES

(76) Inventors: Alain Boivin, 1084 chemin St-Fèlix, St-Henri, Québec (CA), G0R 3E0; Denis Boivin, 1419 CarréBon Accueil, La Pocatière, Québec (CA), G0R 1Z0

( * ) Notice: Subject to any disclaimer, the term of this patent is extended or adjusted under 35 U.S.C. 154(b) by 0 days.

(21) Appl. No.: 09/654,160

(22) Filed: Sep. 1, 2000

(51) Int. Cl.⁷ .............................................. B62D 55/26
(52) U.S. Cl. ...................... 305/178; 305/160; 305/165
(58) Field of Search ................................ 305/157, 160, 305/165, 178, 180

(56) References Cited

U.S. PATENT DOCUMENTS

| | | | | |
|---|---|---|---|---|
| 2,899,242 A | * | 8/1959 | Bombardier | |
| 3,565,493 A | * | 2/1971 | Chaumont | |
| 3,582,155 A | * | 6/1971 | Marier et al. | |
| 4,378,133 A | * | 3/1983 | Trautwein | |
| 4,407,550 A | * | 10/1983 | Lapsys | |
| 4,613,006 A | | 9/1986 | Moss et al. | |
| D333,110 S | | 2/1993 | Mogi et al. | |
| 5,713,645 A | * | 2/1998 | Thompson et al. | 305/168 |
| 5,730,510 A | * | 3/1998 | Courtemanche | |
| 6,109,705 A | * | 8/2000 | Courtemanche | |
| 6,112,840 A | * | 9/2000 | Forbes | |
| 6,203,125 B1 | * | 3/2001 | Arakawa et al. | 305/166 |

* cited by examiner

Primary Examiner—Russell D. Stormer
(74) Attorney, Agent, or Firm—Goudreau Gage Dubuc (57) ABSTRACT

A track for a snow vehicle is described herein. The track is provided with a lug arrangement defined by two different rows of lugs that together define a generally smooth convex profile. The lugs of the first and second rows are staggered, thereby allowing an adequate traction even when the vehicle is severely tilted, without defining a ski-like outer profile that could cause the snow vehicle to slide sideways.

7 Claims, 8 Drawing Sheets

TRACK FOR SNOW VEHICLES

FIELD OF THE INVENTION

The present invention relates to snow vehicles. More specifically, the present invention is concerned with a track for a snow vehicle.

DESCRIPTION OF THE PRIOR ART

Endless tracks are well known in the art of snow vehicles since they are particularly efficient at propelling a vehicle both on soft and hard snow.

Conventional snowmobiles having relatively wide tracks are also well known and many tracks have been designed for them over the years. These conventional snowmobiles usually have a relatively long seat that allow the snowmobiles to be ridden by two people: a driver and a passenger. This, combined with the fact that snowmobiles are relatively wide and provided with a heavy gasoline powered engine, make them relatively bulky recreational vehicles.

A new type of recreational snow vehicle has been proposed to overcome the bulkiness of the conventional snowmobile. It consists of a relatively narrow single-seater snowmobile type recreational vehicle provided with an equally narrow track.

Such a recreational vehicle is described, for example, in U.S. Pat. No. 4,613,006, entitled "ENDLESS BELT DRIVEN CYCLE", issued on Sep. 23, 1986 to Alvin MOSS et al.. The vehicle proposed by Moss is basically a motorcycle where the front wheel has been replaced with a directing ski and the rear wheel has been replaced with a drive arrangement provided with an endless track.

Moss et al. propose the use of an endless track provided with a plurality of cleats spaced apart along an outer surface of the drive track, wherein each of the cleats extends transversely of the track and has a height, perpendicular to the outer surface of the track which increases from opposite side edges of the outer surface to the longitudinal centerline of the outer surface so that each of the cleats has a convex curved outer peripheral surface.

A major drawback of the track described by Moss et al. is the side to side continuity of the cleats. Indeed, this side to side continuity forces Moss et al. to add outwardly projecting ribs extending transversely of the cleats to counteract the lateral slippage of the drive track. Since the convex cleats are continuous from one side to the other of the track, they act as skis when the vehicle is banked for a turn, thereby decreasing the stability of the vehicle.

SUMMARY OF THE INVENTION

According to the present invention, there is provided a track for snow vehicle comprising:

- an endless belt provided with an external surface and having a longitudinal axis; the endless belt also having a width delimited by two opposite lateral sides;
- a plurality of lug arrangements each including:
  - a first transverse row of lugs having at least two first lugs mounted to the outer surface of the endless belt;
  - a second transverse row of lugs having at least two second lugs, the second row of lugs being so mounted to the external surface of the endless belt as to be longitudinally spaced apart from the first row of lugs;

wherein the first lugs and the second lugs are staggered and define a generally smooth convex transverse outer surface.

Other objects, advantages and features of the present invention will become more apparent upon reading of the following non restrictive description of preferred embodiments thereof, given by way of example only with reference to the accompanying drawings.

DESCRIPTION OF THE PREFERRED EMBODIMENT

Figure 1:
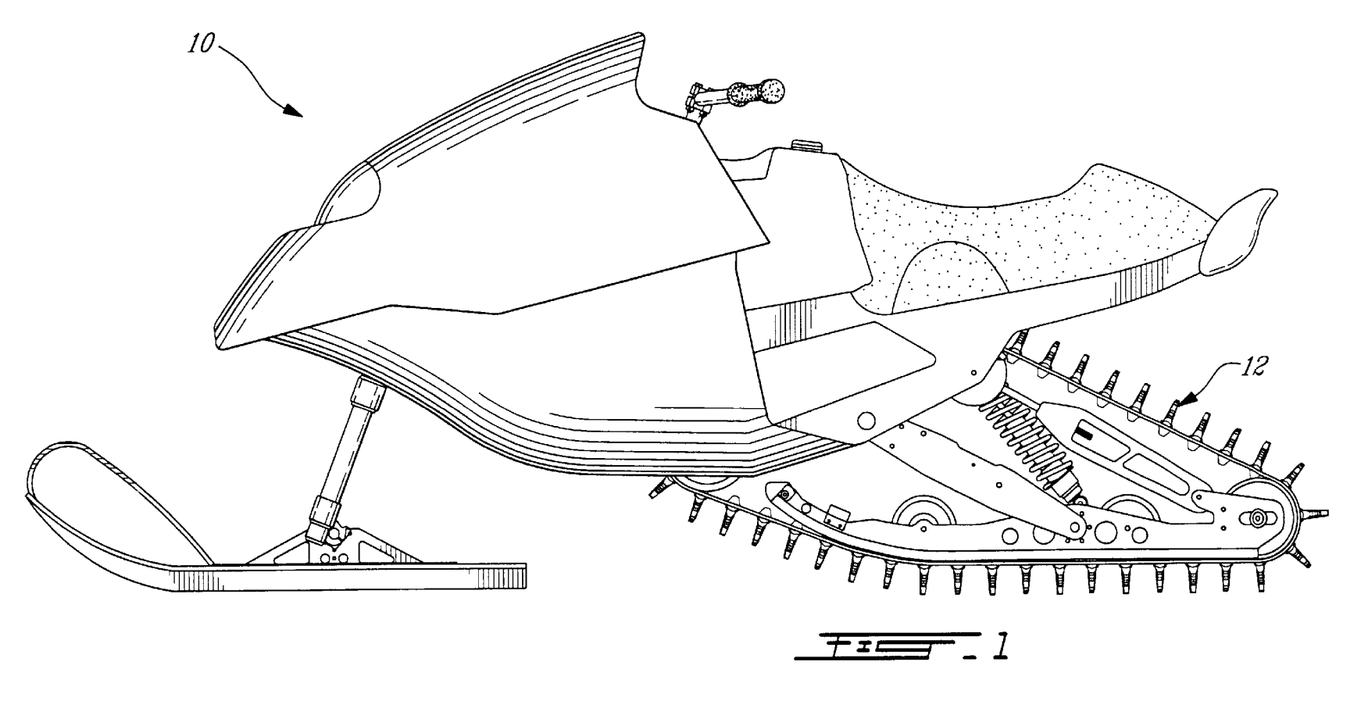
FIG. 1 is a side elevational view of a recreational snow vehicle provided with a track according to an embodiment of the present invention.
Figure 2:
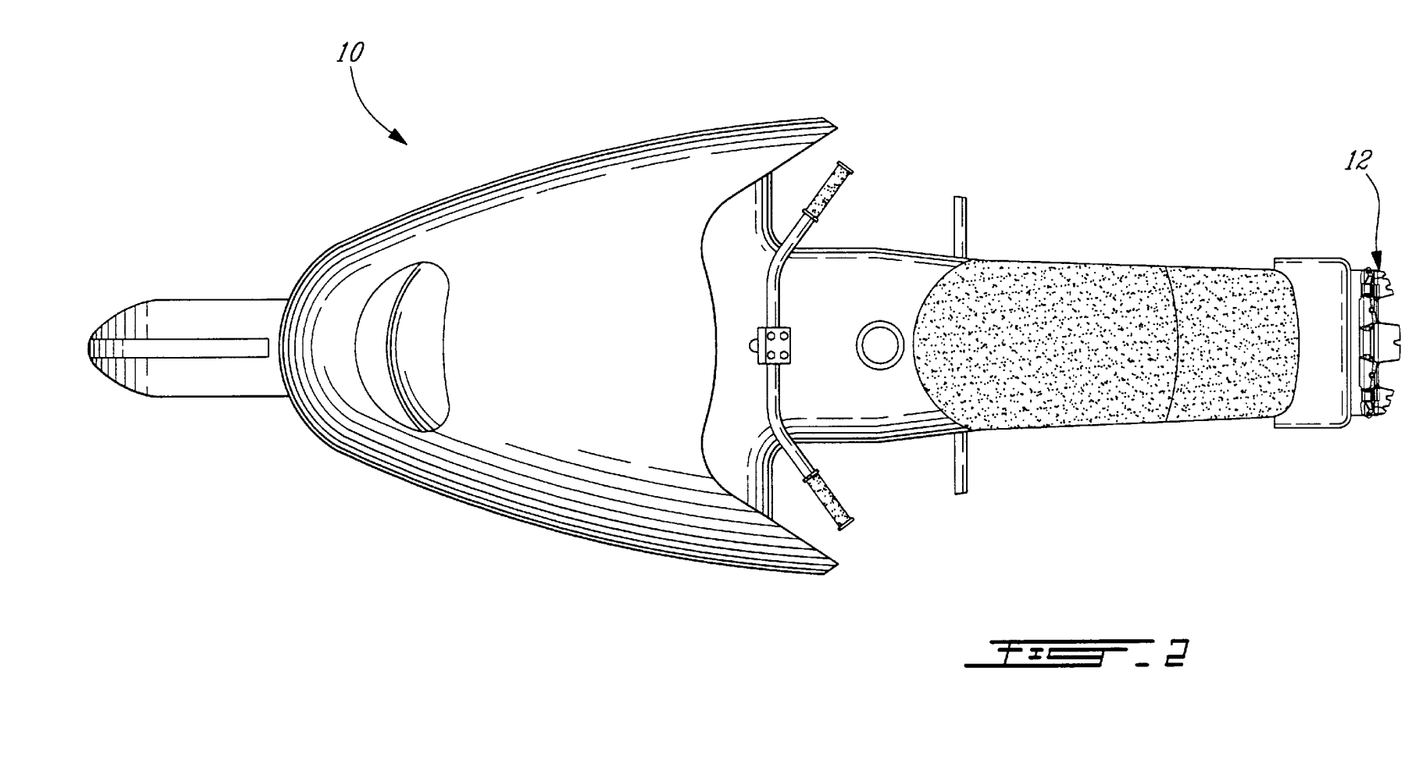
FIG. 2 is a top plan view of the recreational snow vehicle of FIG. 1.

FIGS. 1 and 2 of the appended drawings illustrate a recreational snow vehicle 10 provided with a track 12 according to an embodiment of the present invention. As can be better seen from FIG. 2, the snow vehicle 10, along with the endless track 12, is relatively narrow, thereby allowing the vehicle 10 to be severely tilted during turns.

As will be understood by the following description, the track 12 is designed to give a good traction even when the vehicle 10 is tilted laterally, while preventing lateral slippage of the track 12 onto the ground.

It is to be noted that the general features of snow vehicles and of the endless tracks used to propel snow vehicles are believed well known to one skilled in the art and will therefore not be discussed herein.

Figure 3:
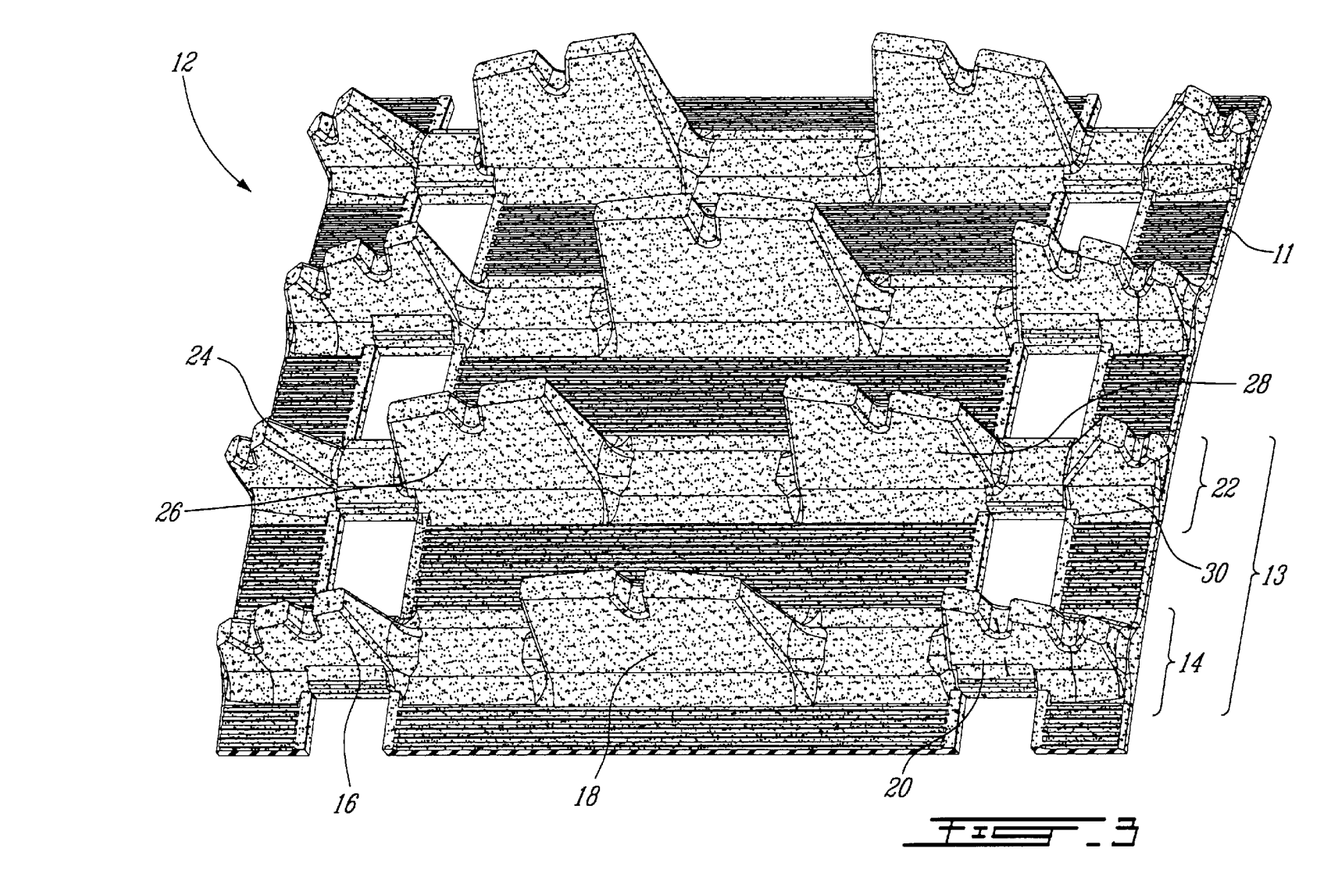
FIG. 3 is a perspective view of a portion of a track according to an embodiment of the present invention.
Figure 4:
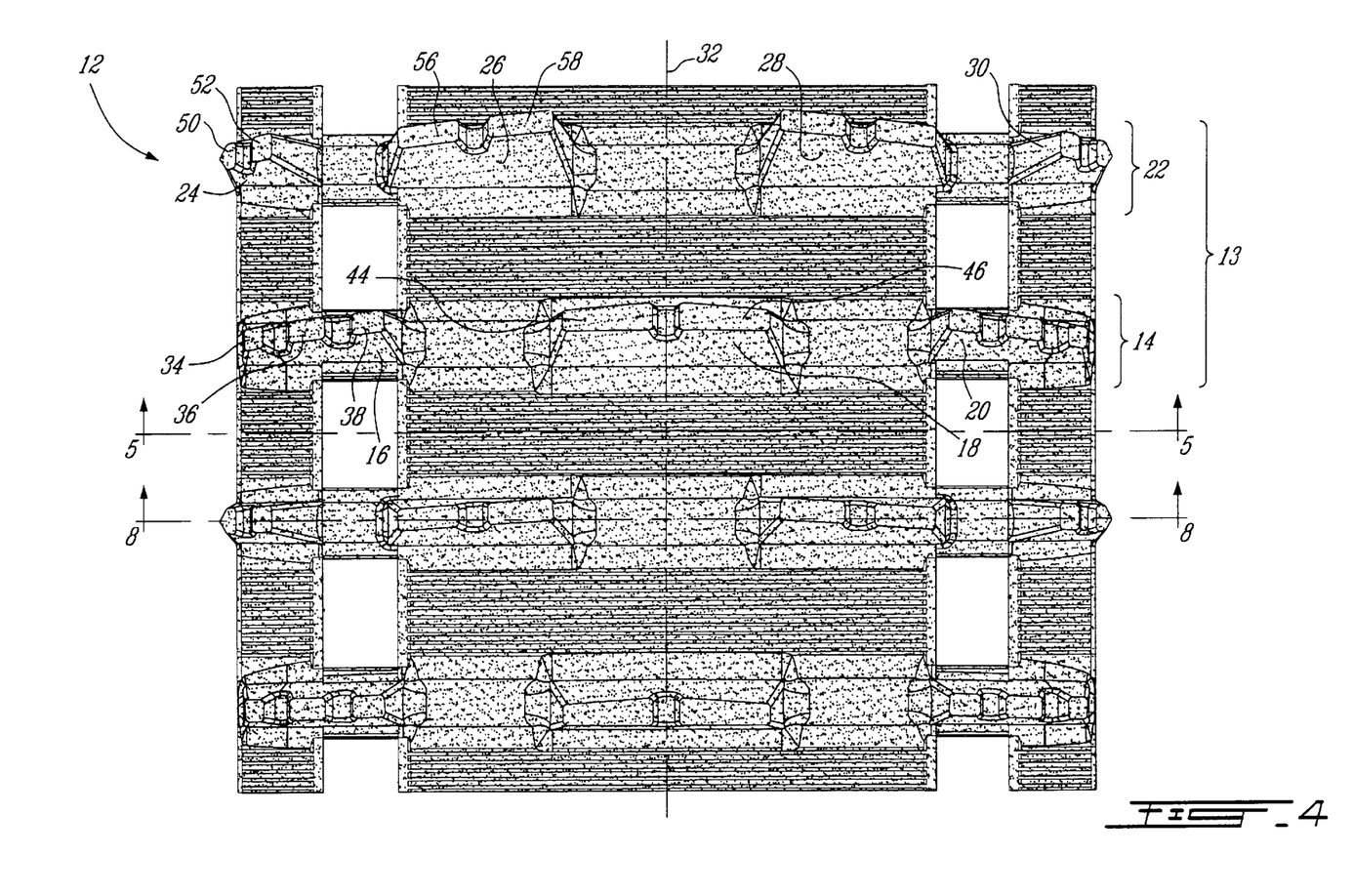
FIG. 4 a is top plan view of the track of FIG. 3.
Figure 5:
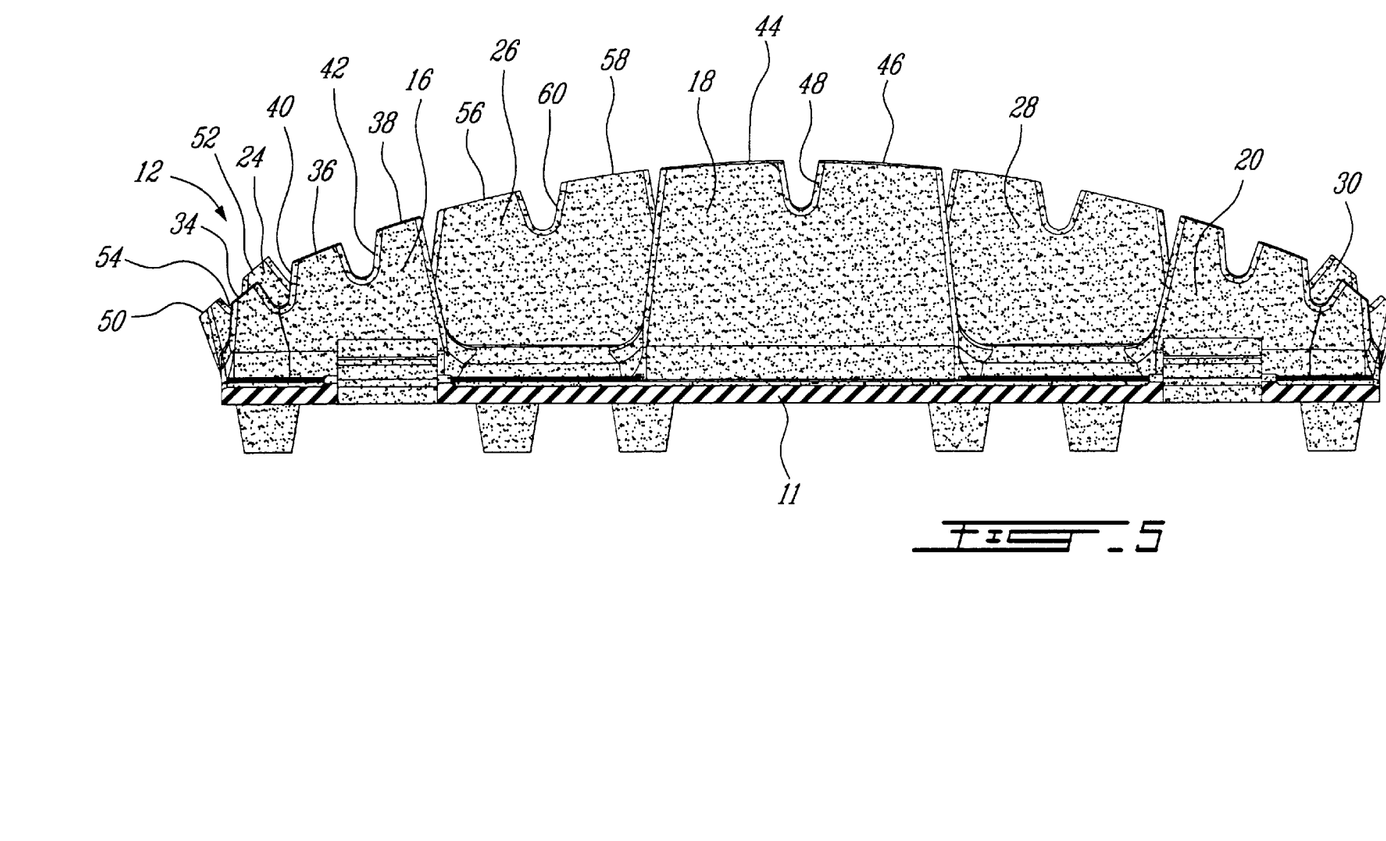
FIG. 5 is a sectional view taken along line 5—5 of FIG. 4, illustrating two adjacent rows of lugs.

Turning now to FIGS. 3–5 of the appended drawings, the track 12 will be described.

The track 12 includes an endless belt 11 onto which a plurality of lugs are mounted or integrally formed, as will be described hereinbelow.

As can be seen from FIG. 5, the overall profile of the track 12, from one side to the other, i.e. transversely, is generally convex. However, to overcome the above-noted drawback of the prior art, the convex profile of the track 12 is created by a lug arrangement 13 comprising two successive transverse rows of lugs arranged in a staggered relationship, as illustrated in FIGS. 3 and 4.

A first transverse row of lugs 14 contains three lugs 16, 18 and 20 and a second row of lugs 22 contains four lugs 24, 26, 28 and 30. These lugs are symmetrical about a longitudinal axis 32 (see FIG. 4).

A first lateral lug 16 of the first row 14 includes three ground contacting surfaces 34, 36 and 38 separated by two indentations 40 and 42. The shape of lateral lug 16 is such that the ground contacting surfaces 34, 36 and 38 are generally transversally convex.

A central lug 18 is centered about longitudinal axis 32 and includes two ground contacting surfaces 44 and 46, separated by an indentation 48. The ground contacting surfaces 44 and 46 are symmetrical about the longitudinal axis 32 and are generally transversally convex.

A second lateral lug 20 is a mirror image of lug 16 about the longitudinal axis 32.

As can be clearly seen from FIG. 3, the first and second lateral lugs 16 and 20 are laterally spaced apart from the central lug 18.

In the second transverse row of lugs 22, a first intermediate lug 24 includes two ground contacting surfaces 50 and 52, separated by an indentation 54. The ground engaging surfaces 50 and 52 are slightly transversally convex.

A first external lug 26 includes two ground contacting surfaces 56 and 58 that are separated by an indentation 60. As is apparent from FIG. 5, the ground contacting surfaces 56 and 58 are transversally convex.

Finally, the second intermediate lug 28 and the second external lug 30 are respectively mirror images of lugs 26 and 24 with respect to the longitudinal axis 32. For concision purposes, these lugs will not be further described herein.

Of course, the lug arrangement 13 defined by the rows 14 and 22 is repeated onto the entire external surface of the track 12.

As it is apparent from FIG. 5, the ground contacting surfaces of symmetrical lugs 24 and 30 are not aligned with the outer surfaces of the outer lugs to form a continuous profile. Indeed, the ground contacting surfaces of lugs 24 and 30 are more angled and exceed the convex profile defined by the other lugs. This configuration of the outer lugs is advantageous since it further prevents the vehicle from tipping over during sharp turns at high speed when the vehicle 10 is severely tilted.

Figure 6:
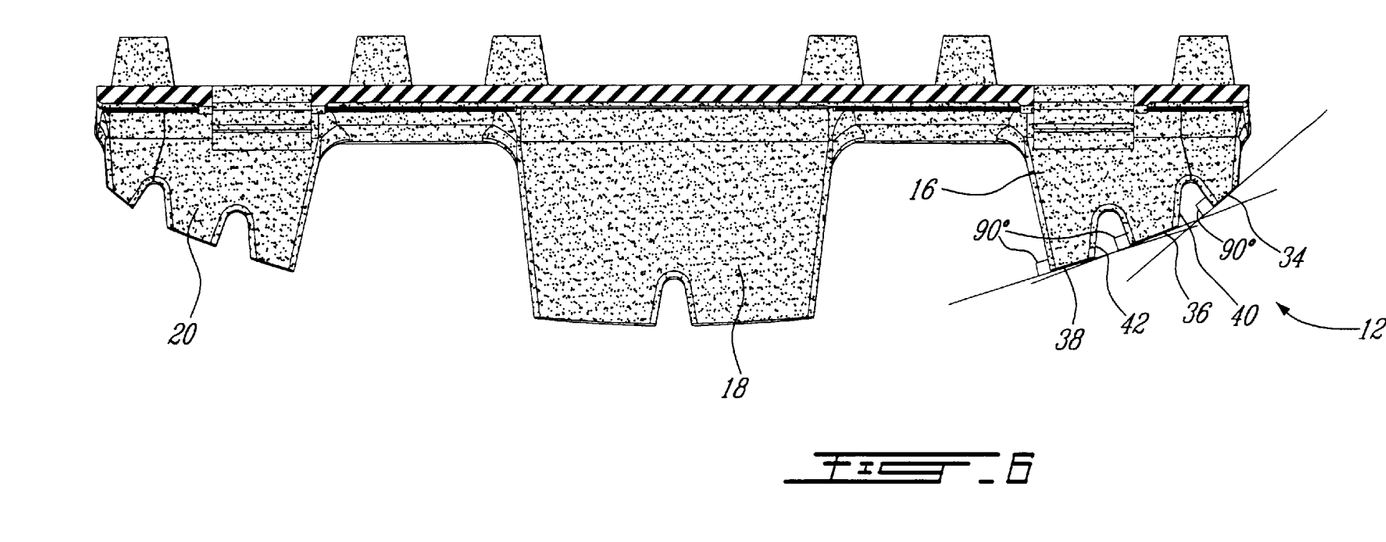
FIG. 6 is a sectional view similar to FIG. 5 but illustrating only one of the two different rows of lugs.
Figure 7:
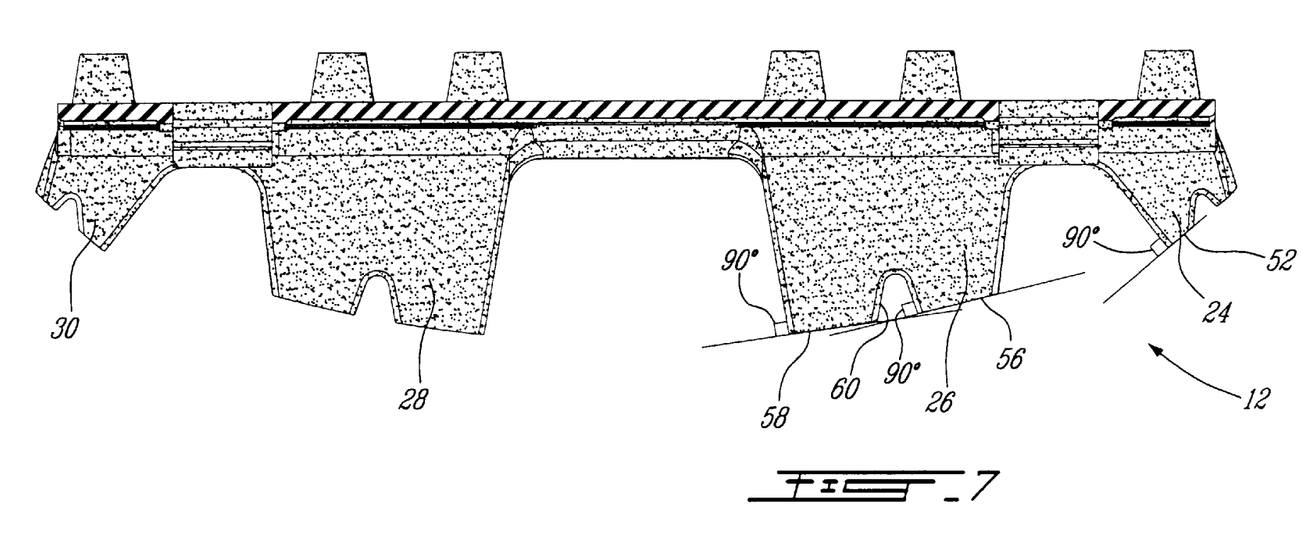
FIG. 7 is a sectional view similar to FIG. 5 but illustrating only the other of the two different rows of lugs.

Turning now briefly to FIGS. 6 and 7 of the appended drawings, another lateral slippage preventing feature will be described. These figures illustrate the angular relationship between the ground contacting surfaces 24, 38 and 58, in contact with the ground when the vehicle is tilted laterally, and the side walls of the corresponding lugs. Since these angles are 90 degrees, the friction between the side of the lugs and the ground prevent the vehicle from sliding laterally. FIGS. 6 and 7 also illustrate that the angular relationship between the ground contacting surfaces 34, 36 and 56 and the respective indentations 40, 42 and 60 is also 90 degrees for the same reasons.

Furthermore, as will be understood by one skilled in the art from the inspection of the different ground representing lines of these figures, the vehicle provided with a track 12 is stable at many tilt angles. It is therefore an advantage to design a track 12 where the ground contacting surfaces are provided at various angles as illustrated and described herein.

Figure 8:
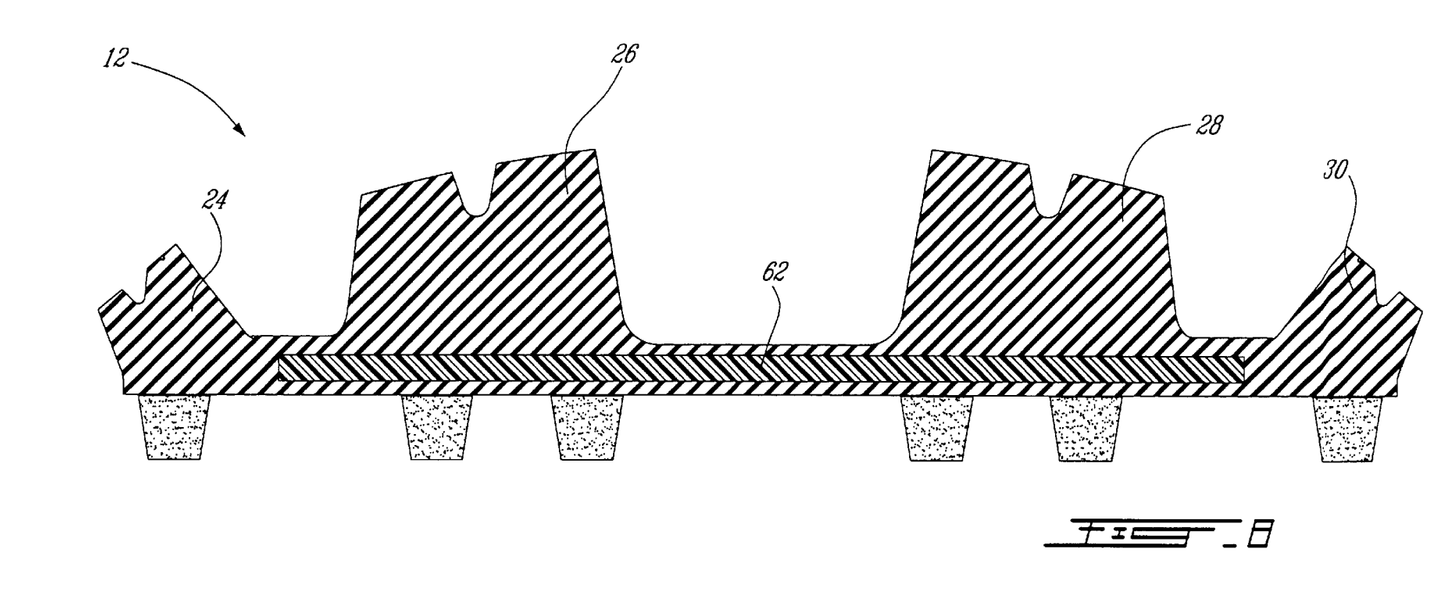
FIG. 8 is a sectional view taken along line 8—8 of FIG. 4, illustrating two adjacent rows of lugs.

Turning Finally to FIG. 8 of the appended drawings, which is a sectional view taken along line 8—8 of FIG. 4, a third lateral slippage preventing feature will be described.

As is well known to those skilled in the art of endless tracks for vehicles, metallic of fibre inserts are usually embedded under the rows of lugs, in the rubber forming the endless belt. Conventionally, these inserts cover essentially the entire width of the belt, leaving only a minute amount of rubber at both ends for concealment purposes.

As can be clearly seen from FIG. 8, the inserts 62 (only one shown) do not cover the entire width of the track 12 but leave the sides of the track 12 free to flex. Again, this improves the grip between the track and the ground during severe turns since it allows the lugs 24 and 30 to flex more easily while keeping the lugs 16 and 20 reasonably stiff since the inserts 62 runs under a sizable portion of these lugs 16 and 20.

It is to be noted that each ground contacting surface may be provided with a metallic insert, usually in the form of a fastener (not shown), fixedly mounted to lugs ground engaging surfaces to increase the friction between the track 12 and the ground in some conditions.

One of ordinary skills in the art will readily understand that the track 12, when mounted to a snow vehicle, has the advantage of providing an adequate traction even when the vehicle is severely tilted, without defining a ski-like outer profile that could cause the vehicle to slide sideways.

It is finally to be noted that the number of different rows, the number of lugs on each row and the number of ground engaging surfaces on each lug could be different from the above description without departing from the spirit and nature of the present invention.

Although the present invention has been described hereinabove by way of preferred embodiments thereof, it can be modified, without departing from the spirit and nature of the subject invention as defined in the appended claims.

What is claimed is:

1. A track for snow vehicle comprising:
an endless belt provided with an external surface and having a longitudinal axis; said endless belt also having a width delimited by two opposite lateral sides;
a plurality of lug arrangements each including:
a first transverse row of lugs having at least two first lugs mounted to said outer surface of said endless belt; each said at least two first lugs having a predetermined height; said at least two first lugs includes a central lug and two lateral lugs; each said first lateral lug being transversely spaced apart from said central lug,
a second transverse row of lugs having at least two second lugs; said second row of lugs being so mounted to said external surface of said endless belt as to be longitudinally spaced apart from said first row of lugs; each said at least two second lugs having a predetermined height; said at least two second lugs includes two intermediate lugs symmetrically positioned about said longitudinal axis, and two external lugs symmetrically positioned about said longitudinal axis;
wherein said first lugs and said second lugs are staggered and their respective predetermined height define, when viewed from a longitudinal direction, a generally smooth convex transverse outer surface.

2. A track for snow vehicle as recited in claim 1, wherein each said two intermediate lugs is so positioned as to be longitudinally aligned with a free space provided between said central lug and a respective lateral lug of said first transverse row of lugs.

3. A track for snow vehicle as recited in claim 1, wherein each said lateral lug includes at least one ground contacting surface and a side wall joining said at least one ground contacting surface and said external surface of said endless belt; one of said at least one ground contacting surface defining, with said side wall, an angle of about 90 degrees.

4. A track for snow vehicle as recited in claim 1, wherein each said intermediate lug includes at least one ground contacting surface and a side wall joining said at least one ground contacting surface and said external surface of said endless belt; one of said at least one ground contacting surface defining, with said side wall, an angle of about 90 degrees.

5. A track for snow vehicle as recited in claim 1, wherein each said external lug includes at least one ground contacting surface and a side wall joining said at least one ground contacting surface and said external surface of said endless belt; one of said at least one ground contacting surface defining, with said side wall, an angle of about 90 degrees.

6. A track for snow vehicle as recited in claim 1, wherein said two external lugs having such a height that they exceed from said generally smooth convex transverse outer surface of the lug arrangement.

7. A track for snow vehicle as recited in claim 1, wherein each said row of lugs includes an insert embedded in the material forming the endless belt; said insert being so sized as to cover a portion of said width of said endless belt.

* * * * *

UNITED STATES PATENT AND TRADEMARK OFFICE
CERTIFICATE OF CORRECTION

PATENT NO. : 6,505,896 B1
DATED : January 14, 2003
INVENTOR(S) : Boivin et al.

It is certified that error appears in the above-identified patent and that said Letters Patent is hereby corrected as shown below:

Title page,
Item [30], Foreign Application Priority Data, please insert the following:
-- [30]  2,281,341 filed Sept. 2, 1999 --.

Signed and Sealed this

Twenty-second Day of June, 2004

JON W. DUDAS
*Acting Director of the United States Patent and Trademark Office*